(12) United States Patent
Chen et al.

(10) Patent No.: US 12,040,526 B2
(45) Date of Patent: Jul. 16, 2024

(54) METHOD FOR MANUFACTURING EMBEDDED PACKAGE STRUCTURE HAVING AIR RESONANT CAVITY

(71) Applicant: Zhuhai ACCESS Semiconductor Co., Ltd, Guangdong (CN)

(72) Inventors: Xianming Chen, Guangdong (CN); Lei Feng, Guangdong (CN); Benxia Huang, Guangdong (CN); Jindong Feng, Guangdong (CN); Yejie Hong, Guangdong (CN)

(73) Assignee: Zhuhai ACCESS Semiconductor Co., Ltd., Guangdong (CN)

( * ) Notice: Subject to any disclaimer, the term of this patent is extended or adjusted under 35 U.S.C. 154(b) by 359 days.

(21) Appl. No.: 17/220,151

(22) Filed: Apr. 1, 2021

(65) Prior Publication Data
US 2021/0399400 A1    Dec. 23, 2021

(30) Foreign Application Priority Data

Jun. 19, 2020   (CN) .......................... 202010567865.1

(51) Int. Cl.
| | |
|---|---|
| *H01P 11/00* | (2006.01) |
| *B32B 37/00* | (2006.01) |
| *C25D 5/00* | (2006.01) |
| *C25D 7/00* | (2006.01) |
| *B32B 37/12* | (2006.01) |
| *C25D 5/02* | (2006.01) |

(52) U.S. Cl.
CPC ........ *H01P 11/008* (2013.01); *B32B 37/1284* (2013.01); *C25D 5/022* (2013.01); *C25D 7/00* (2013.01)

(58) Field of Classification Search
CPC ...... B32B 37/1284; C25D 5/022; C25D 7/00; H01P 11/008
See application file for complete search history.

(56) References Cited

U.S. PATENT DOCUMENTS

| | | | | |
|---|---|---|---|---|
| 9,374,059 | B1 * | 6/2016 | Hurwitz ................... | H03H 3/02 |
| 2004/0164367 | A1 * | 8/2004 | Park ....................... | H03H 9/587 |
| | | | | 257/419 |
| 2004/0257171 | A1 * | 12/2004 | Park ....................... | H03H 9/706 |
| | | | | 333/133 |
| 2015/0279814 | A1 * | 10/2015 | Hurwitz ................. | H01L 24/82 |
| | | | | 257/774 |
| 2020/0066661 | A1 * | 2/2020 | Tschumakow .......... | H01P 7/065 |

* cited by examiner

*Primary Examiner* — Linda L Gray
(74) *Attorney, Agent, or Firm* — The PL Law Group, PLLC

(57) ABSTRACT

A method for manufacturing an embedded package structure having an air resonant cavity according to an embodiment includes manufacturing a first substrate including a first insulating layer, a chip embedded in the insulating layer, and a wiring layer on a terminal face of the chip of the first substrate, wherein the wiring layer is provided thereon with an opening revealing the terminal face of the chip; manufacturing a second substrate which comprises a second insulating layer; locally applying a first adhesive layer on the wiring layer such that the opening revealing the terminal face of the chip is not covered; and applying a second adhesive layer on the second substrate; and attaching and curing the first adhesive layer of the first substrate and the second adhesive layer of the second substrate to obtain an embedded package structure having an air resonant cavity on the terminal face of the chip.

14 Claims, 15 Drawing Sheets

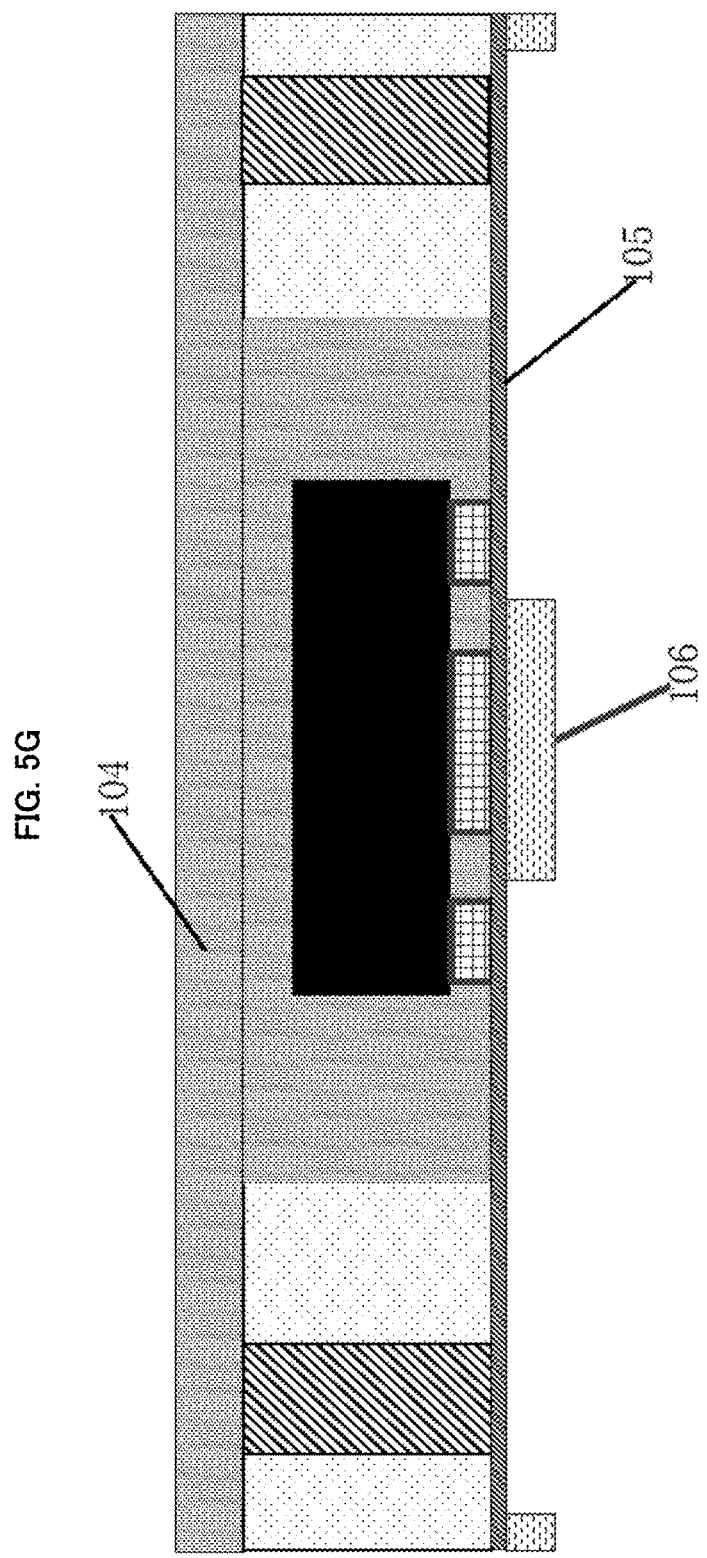

METHOD FOR MANUFACTURING EMBEDDED PACKAGE STRUCTURE HAVING AIR RESONANT CAVITY

CROSS-REFERENCE TO RELATED APPLICATION AND CLAIM OF PRIORITY

This application claims priority to China Patent Applications No. 202010567865.1 filed on Jun. 19, 2020 in the China National Intellectual Property Administration (CNIPA), the entire disclosure of which is incorporated by reference herein.

BACKGROUND

1. Technical Field

The present invention relates to a method for manufacturing an embedded package structure having an air resonant cavity.

2. Description of the Related Art

Filtering is a fundamental and important technology in signal processing. By the filtering technology, a useful signal is provided from various signals, while the undesired interfering signals are filtered. A filter is an important device in the signal frequency domain analysis. The useful signal processed by the filter is further strengthened (magnified), while the undesired signals are filtered. The principle of magnifying the useful signal and filtering the undesired signals is achieved by resonance of signals in the medium.

Taking the surface acoustic wave filter as an example, two transducers (for transmitting and receiving terminals) are provided on the matrix of the piezoelectric material and the input signal is added to the transducer on the transmitting terminal. With the piezoelectric effect of the matrix, the electric signal is transformed into an acoustic signal (i.e. surface acoustic wave) propagating along the surface of the matrix. After the acoustic wave reaches the transducer on the receiving terminal, the acoustic signal is transformed into an electric signal which will be output to the load. During the electric-acoustic-electric transformation and acoustic transmission, the filtering operation is achieved to transform one broadband signal into N narrowband signals, or vice versa.

In the prior art, the current method for forming an air cavity mainly includes two methods: wafer-level operation and panel-level operation, as shown in FIGS. 1-4, for example.

1. Wafer-level operation—1: as shown in FIG. 1, the Si or SiO$_2$ layer 11, 12 below the structure of electrode 21—dielectric layer 23—electrode 22 is etched off completely to form an air cavity 3. It is highly difficult to completely etch off the structure to form the air cavity. Moreover, the structure of electrode 21—dielectric layer 23—electrode 22 has a small thickness (on the order of 10 nm-100 nm) and has a low processing strength. It is highly possible during etching to cause structure breaking due to the gravity of the etching liquid in the groove or the pressure of the air knife. The yield rate is low, and it is highly difficult to adjust the depth of the air cavity.

2. Wafer-level operation—2: as shown in FIG. 2, two electrodes of the filter are formed on the wafer substrate 30 and the cover 31, respectively. The cover and the wafer substrate form a structure of air cavity 32 with air therein by a manner of high temperature metal bonding. Such bonding manner is high in cost and cannot be used in the panel-level production.

3. Wafer-level operation—3: as shown in FIG. 3, grooves 61, 62 having a certain depth are formed, by depth-controlled etching, on the wafer carrier 51 (such as Si or SiO$_2$, glass, etc.); then the grooves are filled with a sacrificial layer 52; then a structure of electrode 56—insulating layer 53—electrode 57 is formed in sequence; and after it is covered by an insulating layer 54, the sacrificial layer 52 is removed by a method of etching. Such method solves the problem of difficult process above the air cavity and the problem of depth controlling, but during etching of the sacrificial layer, as is it covered from above, it is not easy for the etching liquid or etching gas to exit such that there will be a residual. Moreover, the presence of the liquid/gas inlet and outlet may cause a risk of air tightness of the air cavity.

4. Panel-level operation: as shown in FIG. 4, in the SMT (Surface Mount Technology) processing, the chip 73 is attached onto the substrate 72 by a welding ball 74, then a plastic packaging material 71 having a high viscosity and a low flowability is used to package the chip 73 and is prevented from flowing into the region below the chip 73, thus forming an air cavity 75. Such method is high in processing difficulty degree. The air cavity has to undergo the subsequent processes. It is easy to leak and its depth is difficult to be adjusted. The yield rate is low.

Therefore, in the prior art, the method for forming an air cavity in the package structure has many problems, such as being high in precision of the operation apparatuses as required, poor in stability, inflexible in design, low in production per unit time, high in cost, low in yield rate, etc.

The embodiments of the present invention solve these problems.

SUMMARY

The present invention relates to a method for manufacturing an embedded package structure having an air resonant cavity, including the following steps:
(a) manufacturing a first substrate which includes a first insulating layer, a chip embedded in the insulating layer, and a wiring layer on a terminal face of the chip of the first substrate, wherein the wiring layer is provided thereon with an opening revealing the terminal face of the chip;
(b) manufacturing a second substrate which includes a second insulating layer;
(c) locally/partially applying a first adhesive layer onto the wiring layer such that the opening revealing the terminal face of the chip is not covered; and applying a second adhesive layer onto the second substrate; and
(d) attaching and curing the first adhesive layer of the first substrate and the second adhesive layer of the second substrate to obtain an embedded package structure having an air resonant cavity on the terminal face of the chip.

In some embodiments, the step (a) further includes:
(a1) preparing a frame made of a polymer medium, wherein the frame has a first Cu column passing through the frame and a chip socket surrounded by the frame;

(a2) attaching an adhesive tape onto a bottom face of the frame and placing the chip into the chip socket, wherein the terminal face of the chip is attached onto the adhesive tape;

(a3) filling the chip socket with a first insulating material to form the first insulating layer with the chip embedded therein;

(a4) removing the adhesive tape; and (a5) forming the wiring layer on the bottom face the frame, wherein the wiring layer is formed thereon with the opening revealing the terminal face of the chip.

In some embodiments, the step (a5) further includes:

(a51) applying a first seed layer to the bottom face of the frame;

(a52) applying a first photoresist layer onto the first seed layer and forming a pattern thereon;

(a53) performing Cu electroplating in the pattern to form the wiring layer;

(a54) removing the first photoresist layer; and (a55) removing the revealed seed layer to form the opening revealing the terminal face of the chip.

In some embodiments, the step (a5) further includes:

(a50) thinning the first insulating layer to reveal an end of the first Cu column.

In some embodiments, the step (a1) further includes:

preparing a sacrificial carrier;

arranging a second photoresist layer on the sacrificial carrier;

patterning the second photoresist layer;

performing Cu electroplating in the pattern to form the first Cu column;

peeling the second photoresist layer;

laminating a dielectric polymer to the first Cu column;

thinning and flattening the dielectric polymer to reveal an end of the first Cu column;

removing the sacrificial carrier; and mechanically machining the dielectric polymer to form the chip socket to form the frame.

In some embodiments, the step (b) further includes:

(b1) applying a second insulating material onto a sacrificial carrier to form the second insulating layer;

(b2) forming a second feature layer on the second insulating layer; and (b3) removing the sacrificial carrier to obtain the second substrate.

In some embodiments, the sacrificial carrier is selected from a Cu foil or from a Cu clad laminate having Cu foil double layers on at least one side thereof.

In some embodiments, the step (b) further includes:

applying the second insulating material onto a Cu foil face of the Cu clad laminate having Cu foil double layers on one side thereof, to form the second insulating layer;

forming a first feature layer on the second insulating layer; and removing the Cu clad laminate by separation of the Cu foil double layers such that a single layer of Cu foil remains on a bottom face of the second insulating layer.

In some embodiments, the step (c) further includes:

locally/partially applying the first adhesive layer by at least one manner of selective printing, screen coating and local gluing.

In some embodiments, the first adhesive layer and the second adhesive layer include a thermosetting resin material.

In some embodiments, the first adhesive layer and the second adhesive layer include same or different material(s).

In some embodiments, it further includes the following step:

(e) forming outer feature layers on outsides of the first insulating layer and the second insulating layer.

In some embodiments, the step (e) further includes:

applying a second seed layer onto the first insulating layer;

applying a second photoresist layer onto the second seed layer and forming a pattern thereon;

performing Cu electroplating in the pattern to form a first outer feature layer; and removing the second photoresist layer and etching off the second seed layer.

In some embodiments, the step (e) further includes:

forming a blind hole on a bottom face of the second insulating layer to reveal the wiring layer;

applying a second seed layer onto the bottom face of the second insulating layer and into the blind hole;

applying a third photoresist layer onto the second seed layer and forming a pattern thereon;

performing Cu electroplating in the pattern and the blind hole to form a second outer feature layer and a second Cu column; and removing the third photoresist layer and etching off the second seed layer.

BRIEF DESCRIPTION OF THE DRAWINGS

In order to better understand the present invention and illustrate the embodiments of the present invention, the accompanying drawings are referred to only in an exemplary way.

Specifically referring to the FIGS./drawings, it should be emphasized that the specific graphical representation is provided only in an exemplary way, and only for the purpose of illustrative discussion of the preferred embodiments of the present invention. The graphical representation is provided for the reason that the FIGS. are believed to be useful to make the description of the principle(s) and concept(s) of the present invention understood easily. In this regard, it is intended to illustrate the structural details of the present invention only in a detail degree necessary to generally understand the present invention. The several solutions of the present invention embodied in practice can be appreciated by those skilled in the art with the specific explanation referring to the FIGS. In the FIGS..

DETAILED DESCRIPTION

The following description involves a supporting structure formed by a metal via in a dielectric medium, especially a Cu via-column in a dielectric polymer. For example, the dielectric polymer may be polyimide reinforced with glass fibers, epoxy resin or BT (bismaleimide/triazine resin), polyphenylene oxide (PPE or PPO), or the blends thereof.

Figure 1:
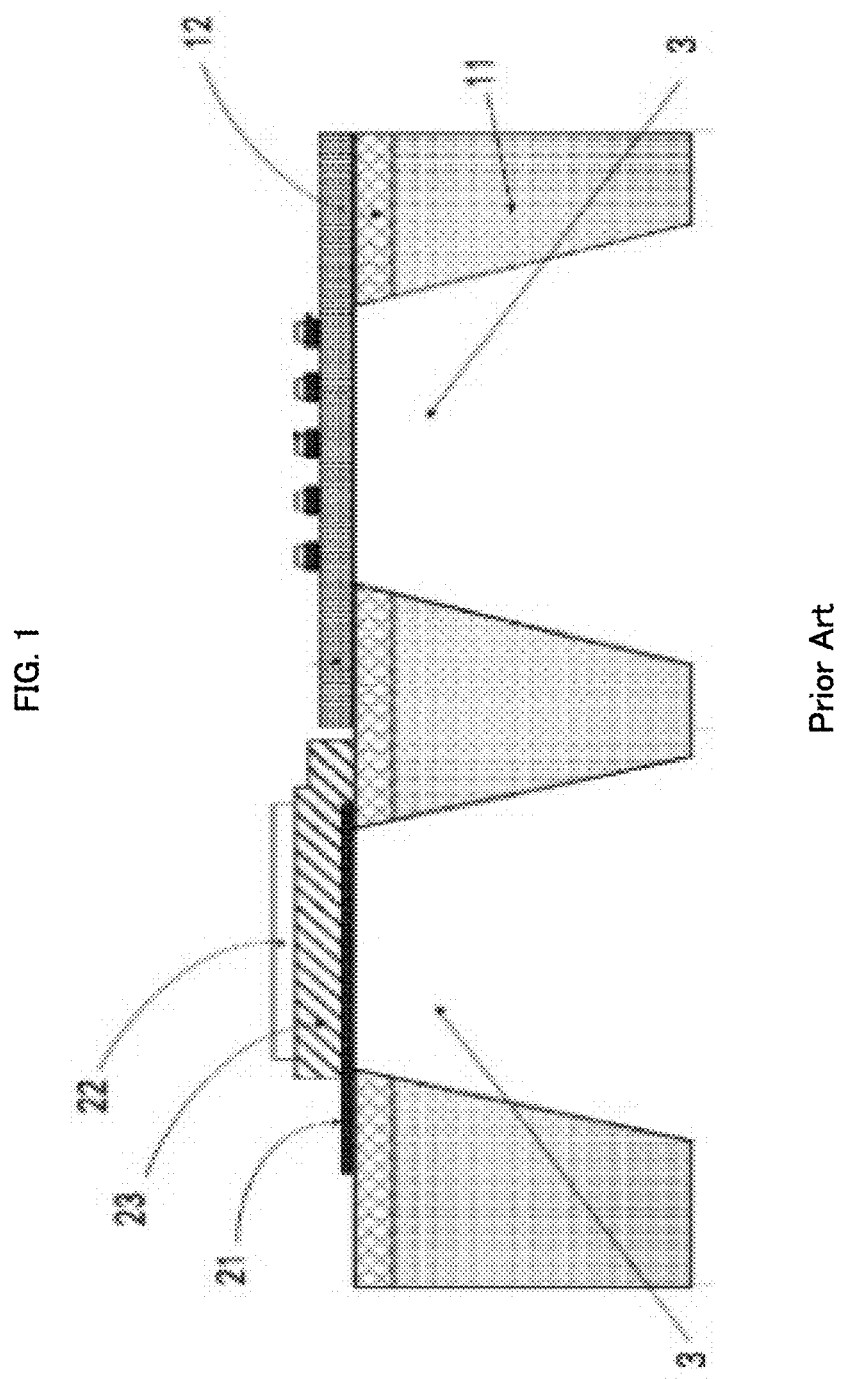
FIG. 1 is a schematic section view of a first structure having an air cavity in the prior art.
Figure 2:
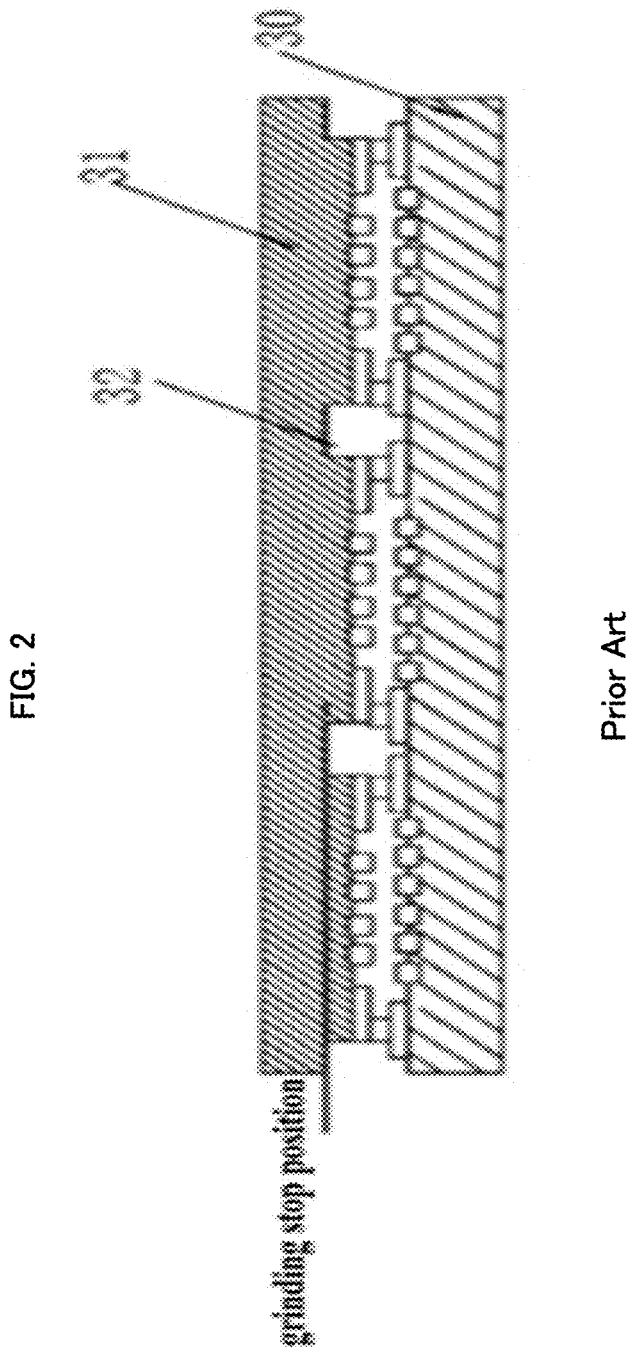
FIG. 2 is a schematic section view of a second structure having an air cavity in the prior art.
Figure 3:
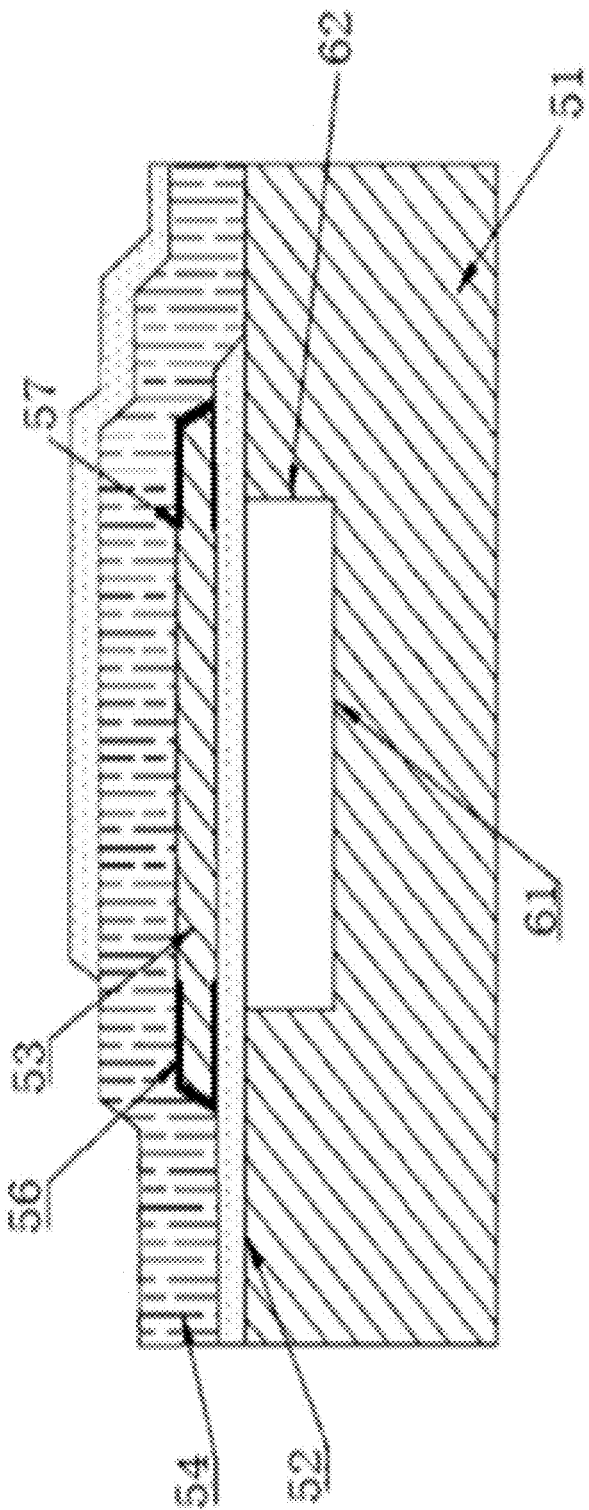
FIG. 3 is a schematic section view of a third structure having an air cavity in the prior art.
Figure 4:
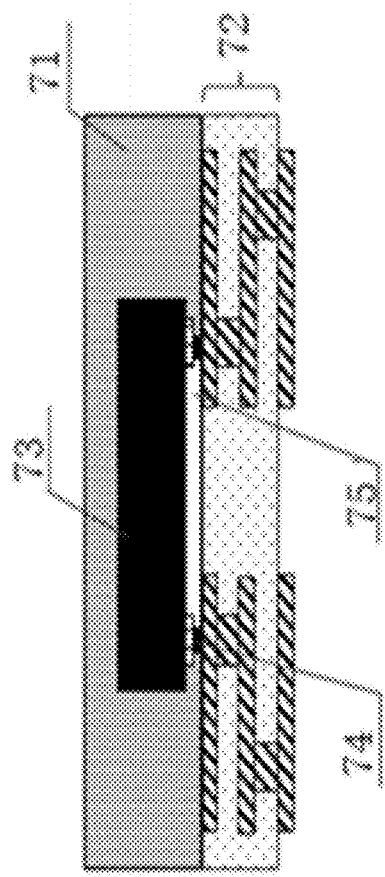
FIG. 4 is a schematic section view of a fourth structure having an air cavity in the prior art.
Figure 5A:
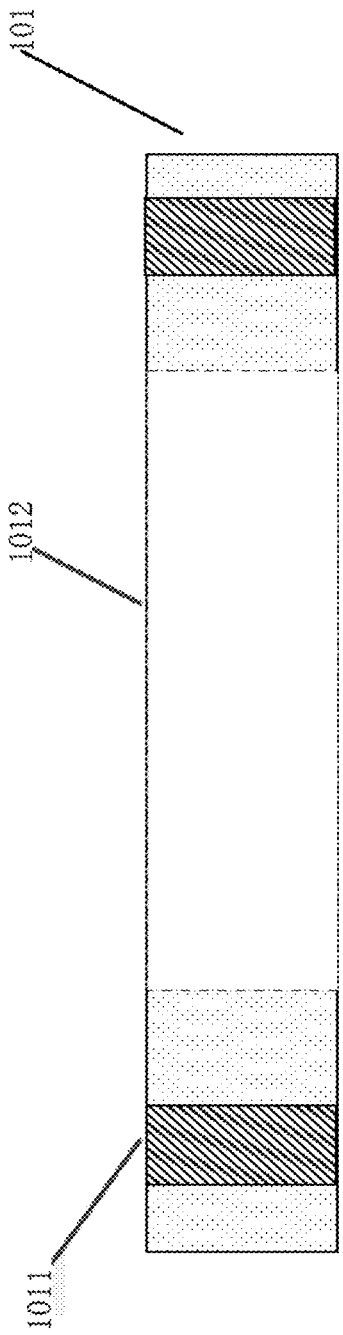
FIGS. 5A-5Q show schematic section views of intermediate structures obtained by the method of the present invention.
Figure 5B:
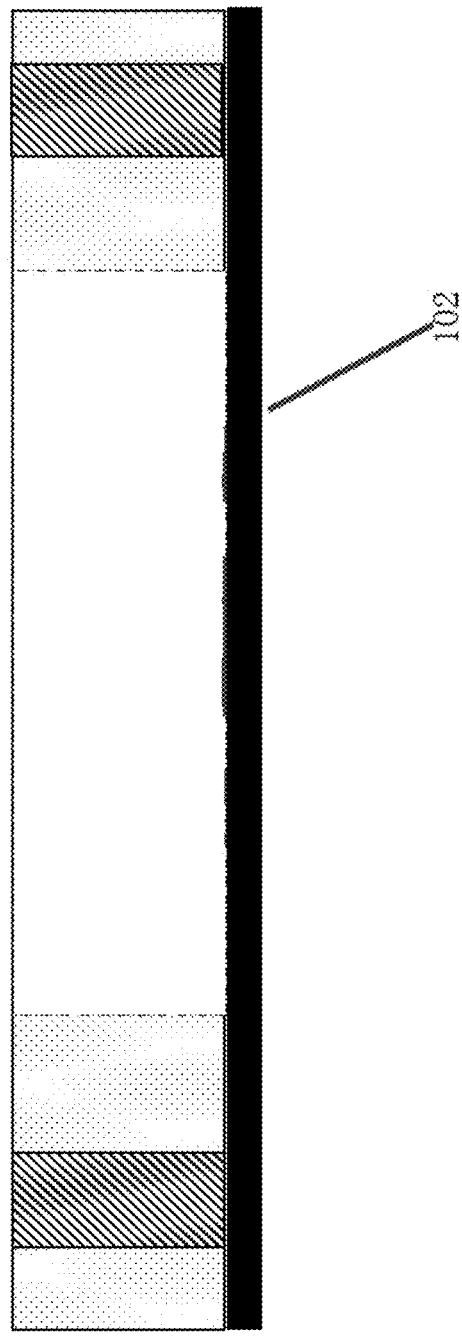
Figure 5C:
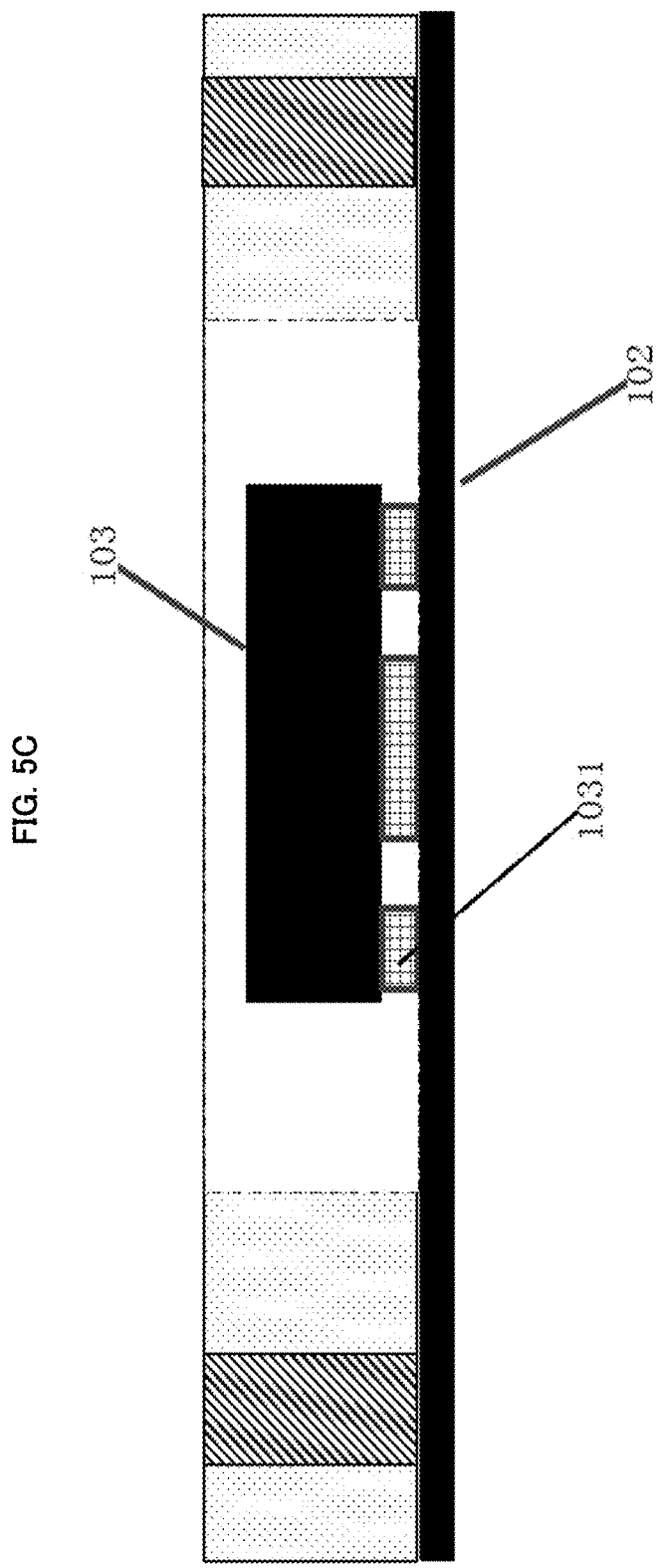
Figure 5D:
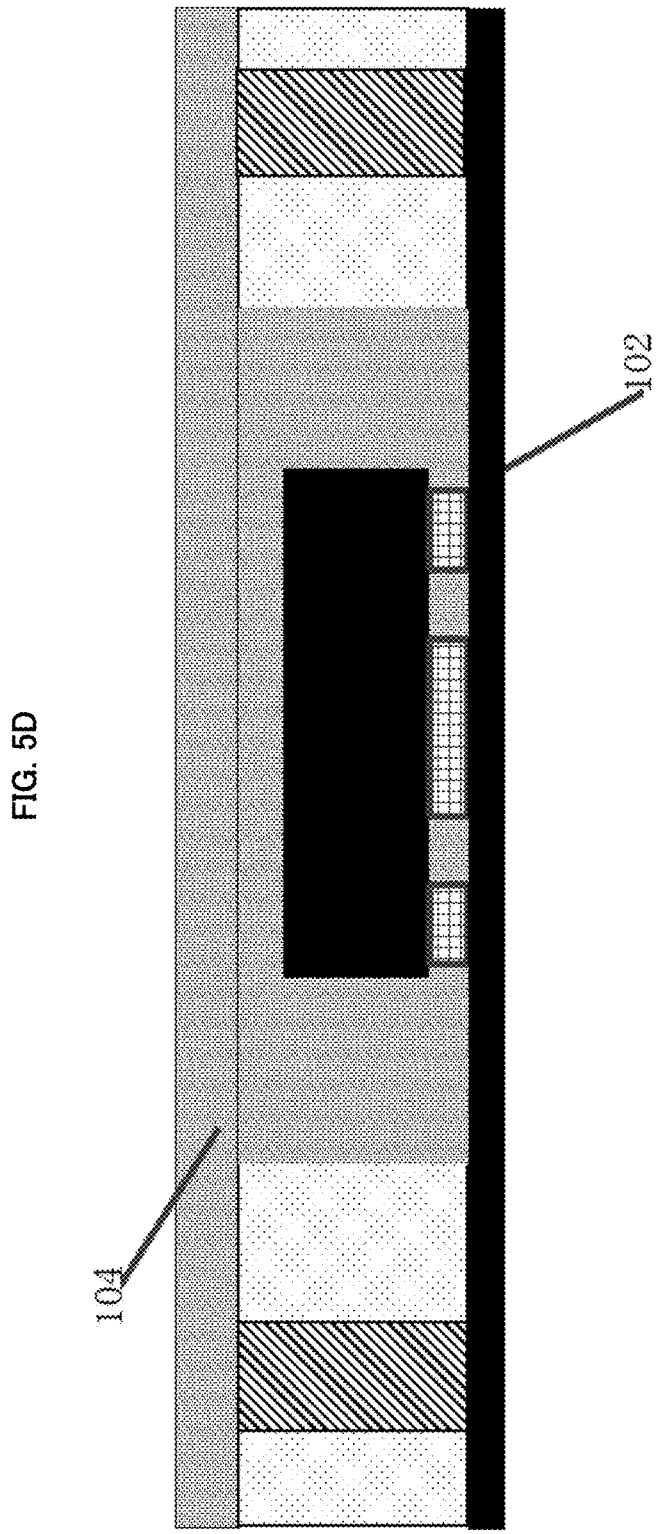
Figure 5E:
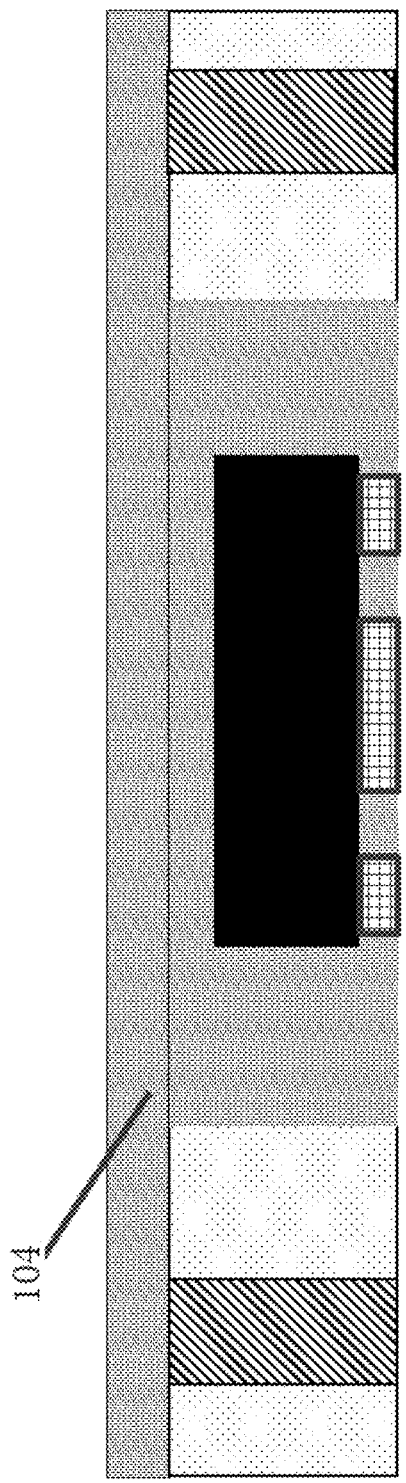
Figure 5F:
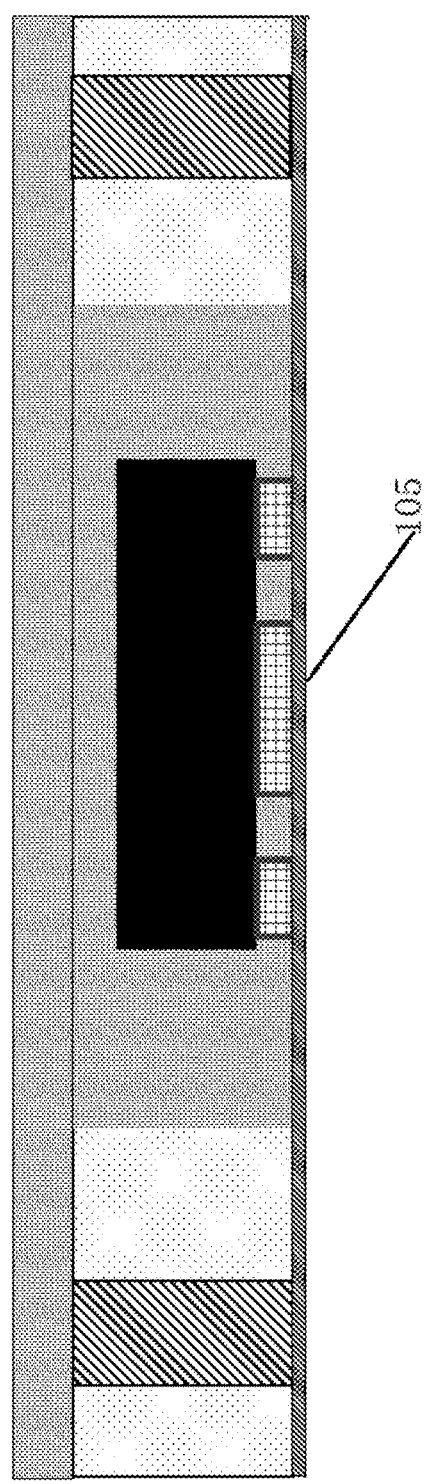
Figure 5H:
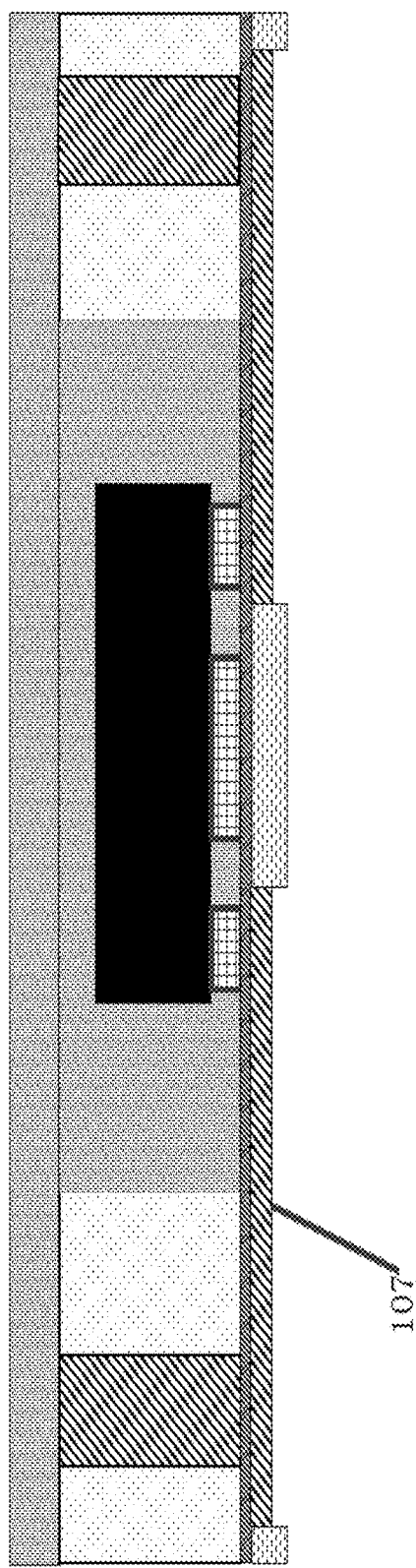
Figure 5I:
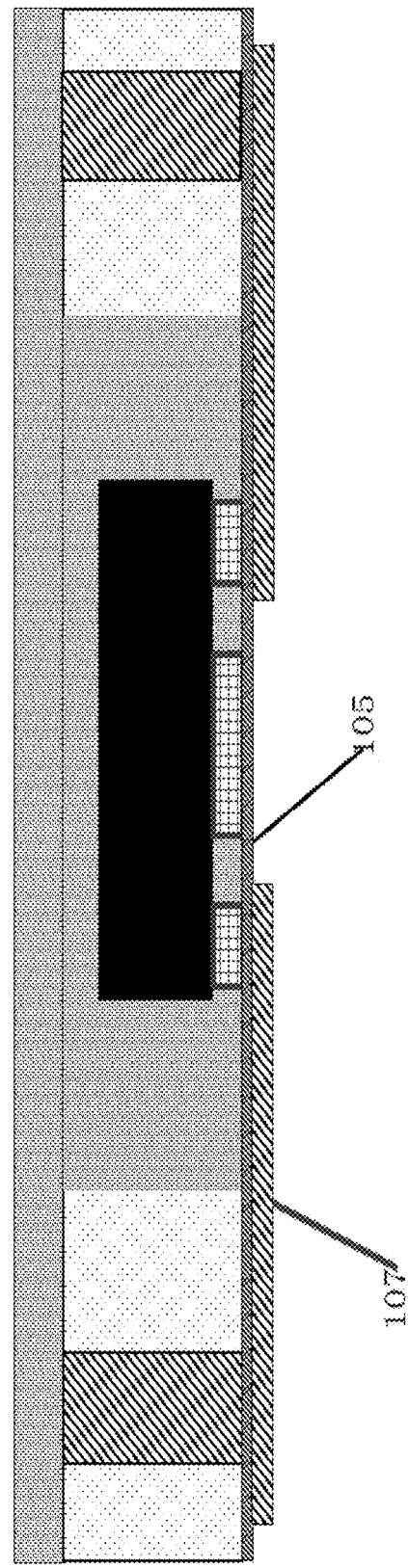
Figure 5J:
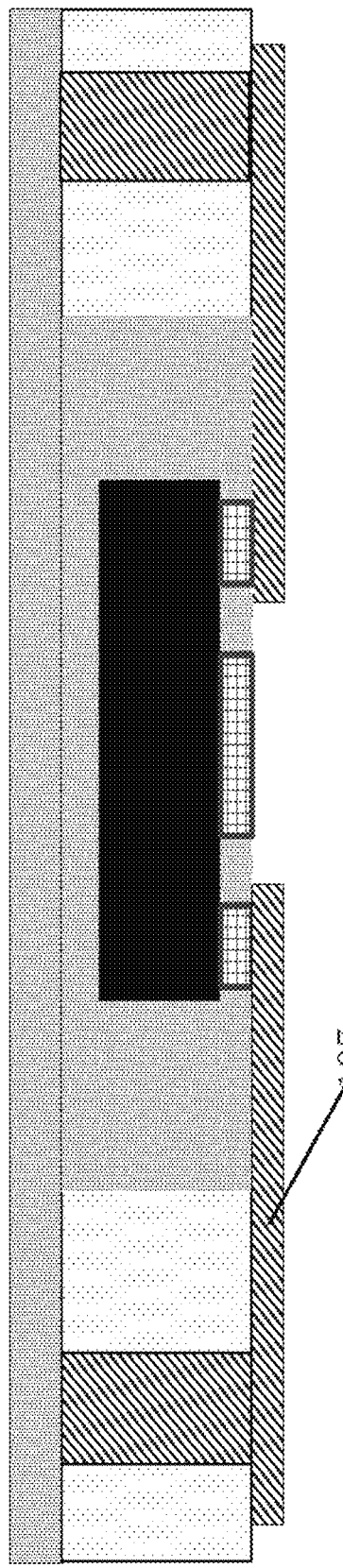
Figure 5K:
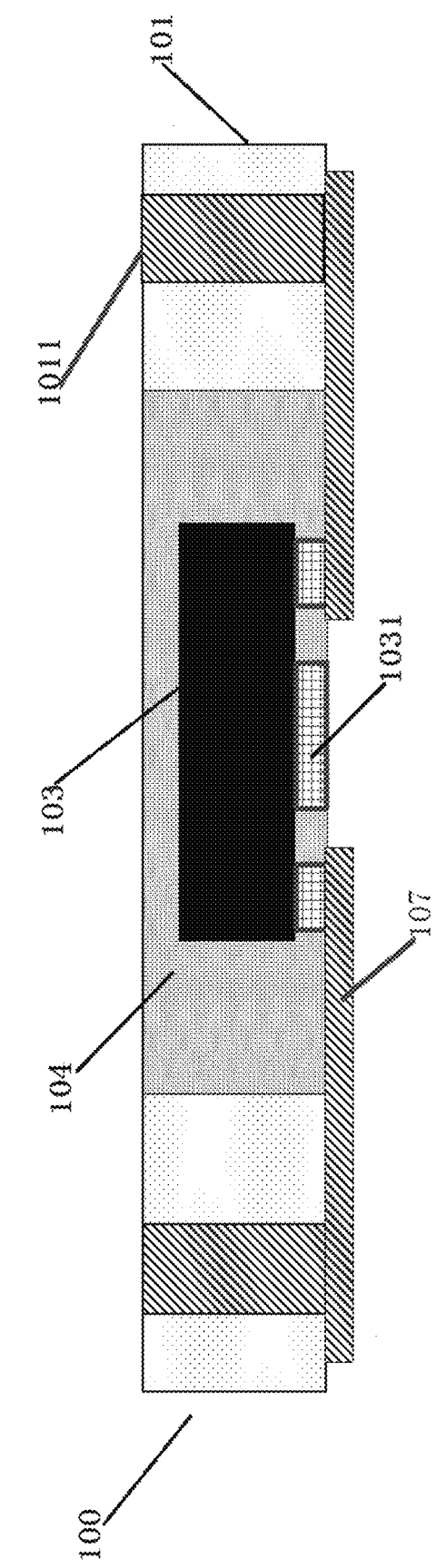
Figure 5L:
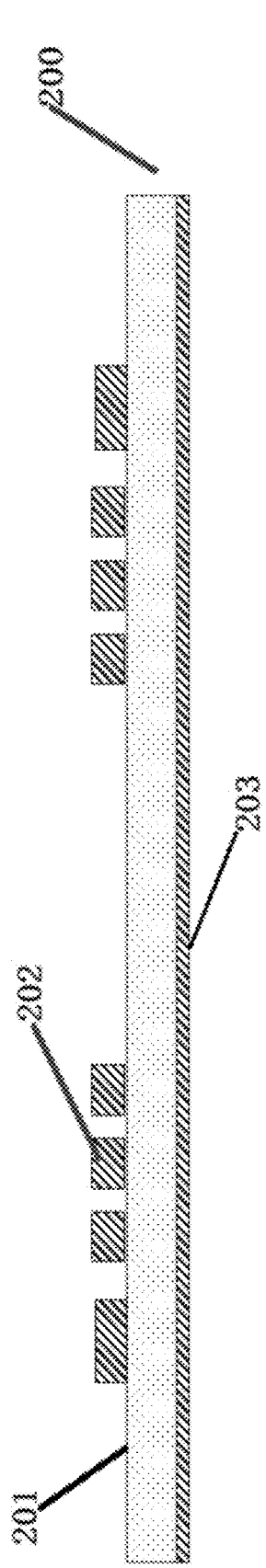
Figure 5M:
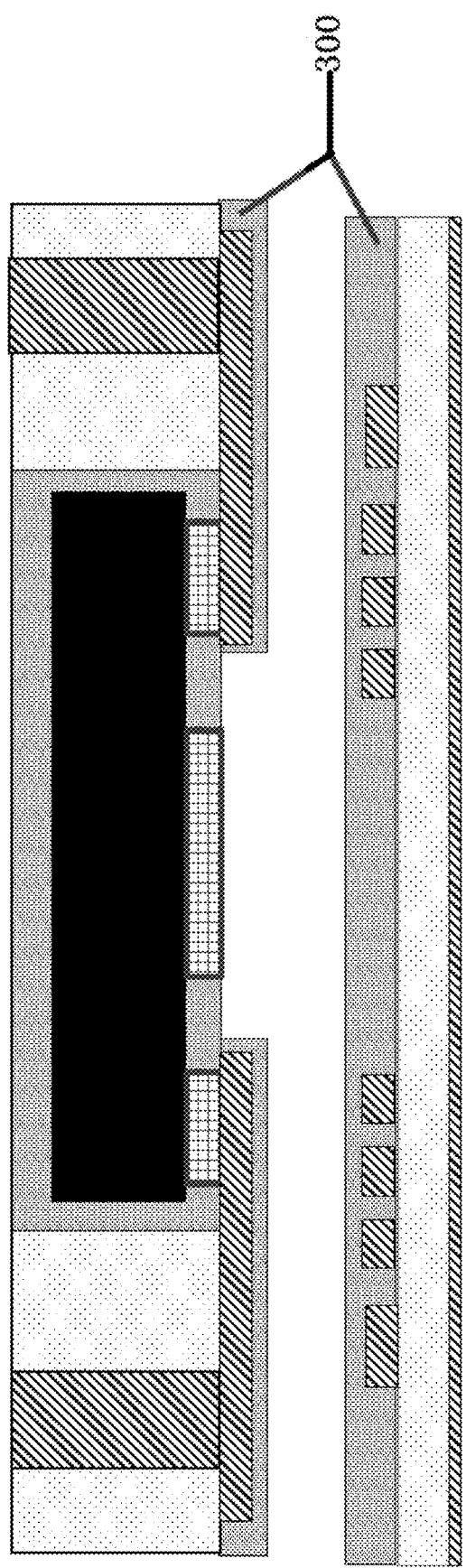
Figure 5N:
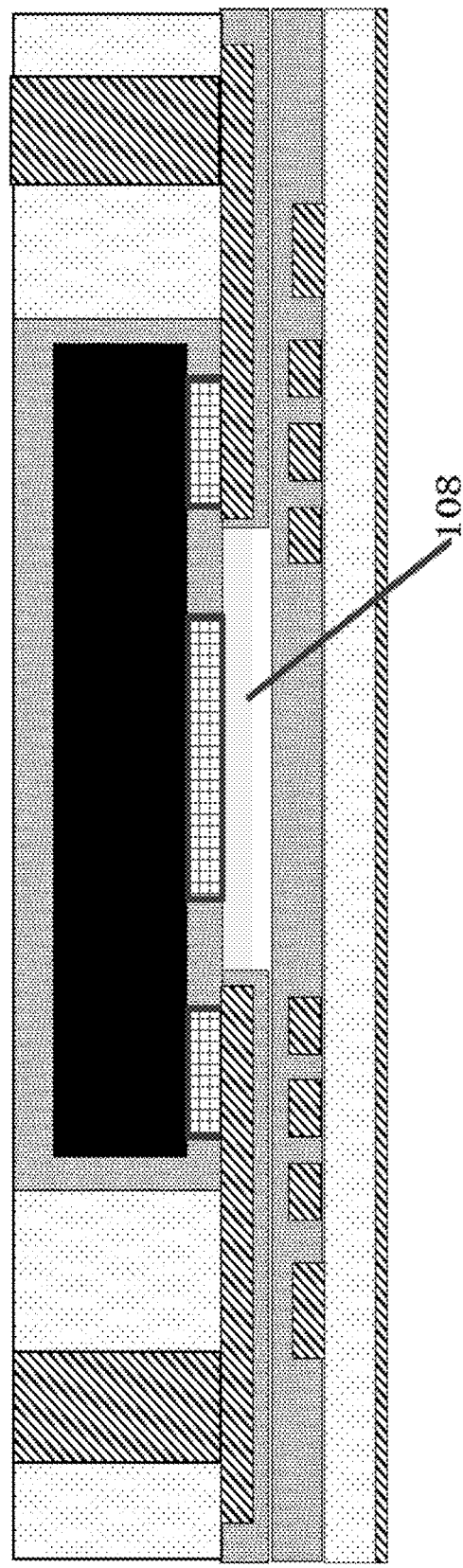
Figure 5O:
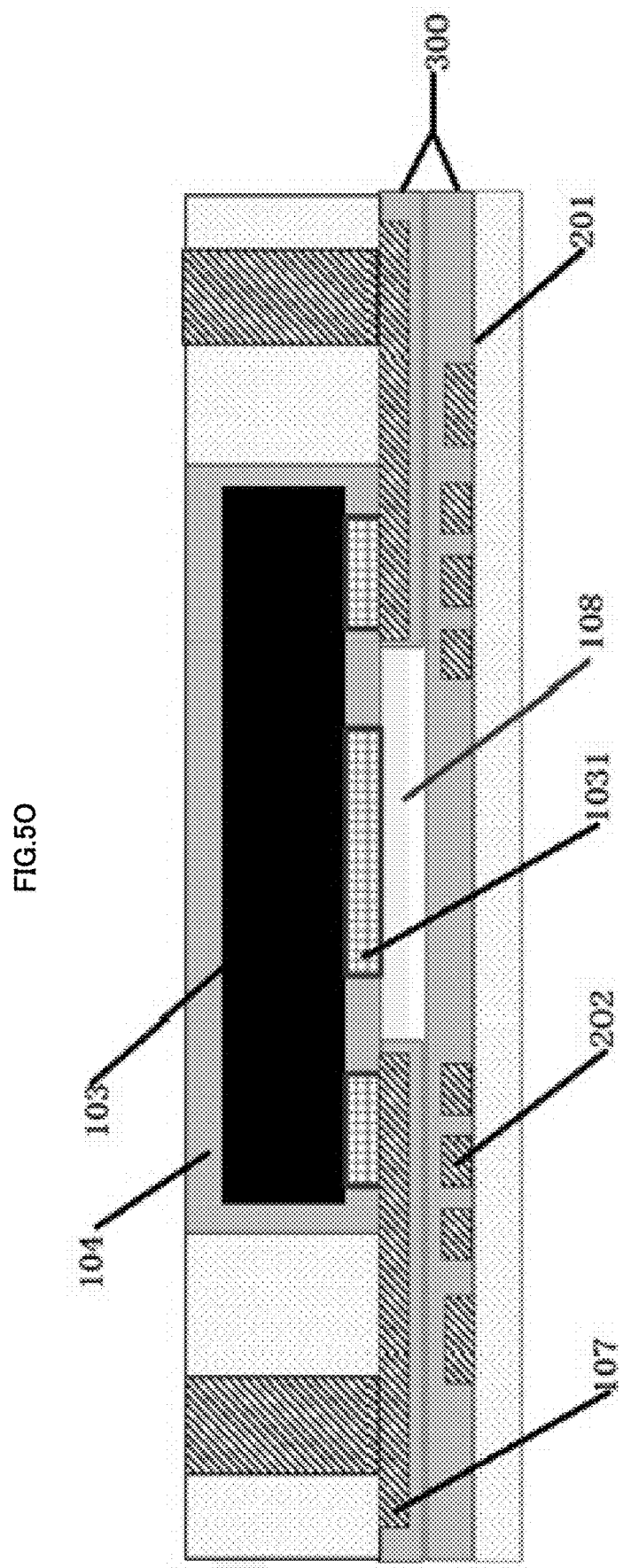
Figure 5P:
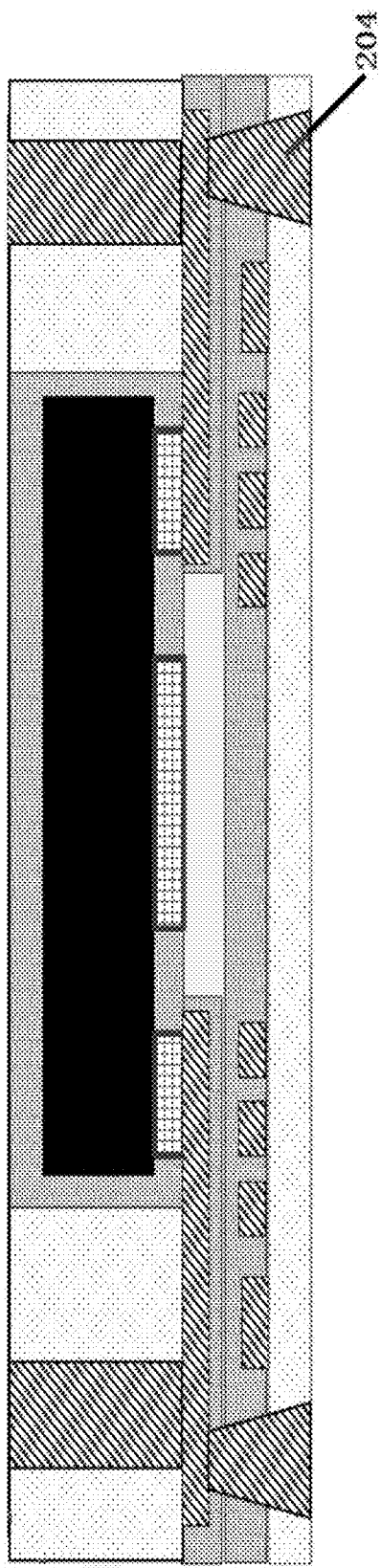
Figure 5Q:
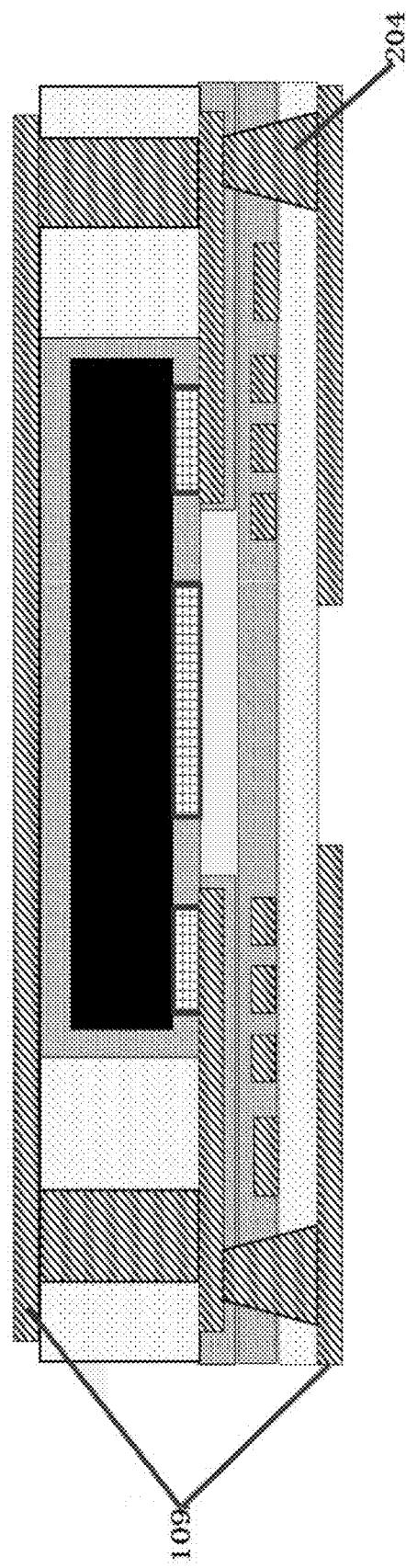

FIGS. 5(A)-5(Q) show schematic section views of intermediate structures obtained by the method of the present invention. A method for manufacturing an embedded package structure having an air resonant cavity includes the following step: manufacturing a frame 101 which includes a first Cu column 1011 and a chip socket 1012 (step (a), as shown in FIG. 5A). This step may include the following sub-steps:

- preparing a sacrificial carrier (which generally may be a Cu carrier);
- arranging a photoresist layer on the sacrificial carrier;
- patterning the photoresist layer;
- performing Cu electroplating in the pattern to form the first Cu column 1011;
- peeling the photoresist layer;
- laminating a dielectric polymer to the first Cu column 1011;
- thinning and flattening the dielectric polymer to reveal an end of the first Cu column 1011;
- removing the sacrificial carrier (the sacrificial carrier may be removed by at least one manner of dissolution, grinding and plasma etching); and
- mechanically machining the dielectric polymer to form the chip socket 1012 to form the frame 101 (the method of mechanically machining may be at least one of stamping/punching and CNC).

The next step is: attaching an adhesive tap 102 onto a bottom face of the frame 101 (step (b), as shown in FIG. 5B). Generally, the adhesive tape may be a commercially available transparent film which can be decomposed by heating or UV light radiation.

The next step is: placing a chip 103 into the chip socket 1012 and adhering a terminal face 1031 of the chip onto the adhesive tap 102 (step (c), as shown in FIG. 5C). Generally, the chip is placed, with its terminal face 1031 facing downwards, into the chip socket 1012. It is possible to perform imaging through the adhesive tape 102 to achieve alignment. By adhering the chip terminal face 1031 onto the adhesive tape 102, it is possible to fix the chip 103 to prevent the chip 103 from displacing during subsequent processes.

The next step is: filling the chip socket 1012 with a first insulating material to form the first insulating layer 104 with the chip 103 embedded therein (step (d), as shown in FIG. 5D).

The first insulating material may be a thermosetting resin material or a photo-setting resin material, curable by heating or light radiation, respectively.

The next step is: removing the adhesive tap 102 (step (e), as shown in FIG. 5E). Generally, in order to remove the adhesive tap 102 to reveal the bottom of the frame 101, the adhesive tap 102 may be removed by at least one manner of heating decomposition and UV light radiation.

The next step is: applying a first seed layer 105 onto the bottom face of the frame 101 (step (f), as shown in FIG. 5F). Generally, the first seed layer 105 may be formed by a manner of sputtering and may be selected from at least one of Ti, Ni, V, Cu, Al, W, Cr, Ag and Au.

The next step is: applying a first photoresist layer 106 onto the first seed layer 105 and forming a pattern thereon (step (g), as shown in FIG. 5G). Generally, the first photoresist layer 106 may be patterned according to the design of product circuits.

The next step is: performing Cu electroplating in the pattern to form the wiring layer 107 (step (h), as shown in FIG. 5H). The wiring layer 107 is formed thereon with an opening revealing the chip terminal face 1031, to facilitate forming the air resonant cavity at the opening in the subsequent process. In addition, the thickness of the wiring layer 107 may be designed according to the required height of the air resonant cavity such that the height of the air cavity can be adjusted.

The next step is: removing the first photoresist layer 106 (step (i), as shown in FIG. 5I). Generally, it may be performed by at least one manner of peeling and etching.

The next step is: removing the first seed layer 105 (step (j), as shown in FIG. 5J). Generally, the first seed layer 105 may be removed by at least one manner of dissolution, grinding and plasma etching.

The next step is: thinning the first insulating layer 104 to reveal an end of the first Cu column 1011 to thus obtain the first substrate 100 (step (k), as shown in FIG. 5K). Generally, the thinning may be achieved by at least one manner of plate grinding and plasma etching.

The next step is: manufacturing a second substrate 200 (step (1), as shown in FIG. 5L). Generally, this step may include the following sub-steps:

- applying a second insulating material onto a sacrificial carrier to form the second insulating layer 201; and
- forming a second feature layer 202 on the second insulating layer 201.

A Cu foil 203 may be provided on another side of the second insulating layer 201 opposite to the second feature layer 202. For example, the Cu foil 203 may be used as the sacrificial carrier. Alternatively, it is possible to use a Cu clad laminate, having Cu foil double layers on at least one side thereof, as the sacrificial carrier, and by separation of the Cu foil double layers, the Cu foil 203 may be remained on the second substrate 200. Remaining the Cu foil 203 may enable the second substrate 200 to remain straight in the subsequent processes.

The next step is: coating adhesive layers 300 onto the wiring layer 107 of the first substrate 100 and the second layer 202 of the second substrate 200, respectively (step (m), as shown in FIG. 5M). Generally, the adhesive layer 300 may be a thermosetting resin material, such as Sumitomo LAZ-7761, and its viscosity at the room temperature may be 1 Pa·s~100 Pa·s. The adhesive layers 300 on the first substrate 100 and the second substrate 20 may include same or different material(s).

The step of coating the adhesive layer 300 onto the wiring layer 107 of the first substrate 100 is generally performed by local/partial coating to ensure that the opening is not covered and the chip terminal face 1031 is not coated with the adhesive layer 300. The local/partial coating may be performed by at least one of selective printing, screen coating and local gluing The next step is: aligning and bonding the adhesive layers 300 of the first substrate 100 and the second substrate 20 with each other and performing curing (step (n), as shown in FIG. 5N). Generally, it is possible to achieve panel-level alignment according to a target point on the first substrate 100 and a target point on the second substrate 20. The adhesive layers 300 are cured under the combined effect of the pressure and temperature and thus an air cavity 108 is formed below the chip terminal face 1031.

Due to the viscosity property of the adhesive layer 300 at the room temperature, most air is retained in the air cavity 108, without generating vacuum. Also, the retained air can prevent the adhesive layer 300 from filling the air cavity 108. The air cavity 108 has a depth adjustable by adjusting the thicknesses of the wiring layer 107, the second feature layer 202 and the adhesive layer 300. The depth of the air cavity 108 is generally 10~50 μm. It is possible to adaptively form the depth of the respective air cavity 108 according to filtering design parameters of the chip 103, such as interdigital width, number of interdigital pair(s), etc., thus achieving the purpose of having different resonance frequencies.

The next step is: removing the Cu foil 203 (step (o), as shown in FIG. 5O). Generally, the Cu foil 203 may be removed by at least one of dissolution, grinding and plasma etching.

The next step is: making a second Cu column 204 passing through the second substrate 200 and conductively connected with the wiring layer 107 (step (p), as shown in FIG. 5P). Generally, the second Cu column 204 may be formed by mechanical or laser hole-opening followed by electroplating.

Finally: forming outer feature layers 109 on an upper surface of the first substrate 100 and a lower surface of the second substrate 200 (step (q), as shown in FIG. 5Q).

This step may include: applying seed layers onto an upper surface of the first substrate 100 and a lower surface of the second substrate 200; applying a photoresist layer onto the seed layer; forming a pattern by exposure and development; performing Cu electroplating in the pattern to form the outer feature layer 109; removing the photoresist layer and etching off the revealed seed layer.

In addition, it is possible to further perform a layer building up process on the outer feature layer 109 to form an additional layer.

With the method(s) of the present invention, a semi-package is enclosed to form an air cavity such that it is not necessary for the formed air cavity to repeatedly undergo the subsequent processes with high temperature and pressure, ensuring air tightness of the air cavity and significantly improving the yield rate of the package substrate having the air cavity. In addition, with the method(s) of the present invention, it is convenient to adjust the depth of the air cavity by the thicknesses of the wiring layer, the adhesive layer and the second feature layer, thus solving the technical problem of having difficulty in adjusting the depth of the air cavity in the prior art.

It will be appreciated by those skilled in the art that the present invention is not limited to the contents as specifically illustrated and described above. Moreover, the scope of the present invention is defined by the appended claims, including combinations and sub-combinations of the various technical features as described above as well as the variations and modifications thereof, which can be anticipated by those skilled in the art by reading the above description.

In the claims, the term "comprise" and its variations, such as "comprises", "comprising", etc., mean that the element(s) as listed will be included, generally without excluding other element(s).

What is claimed is:

1. A method for manufacturing an embedded package structure having an air resonant cavity, the method comprising:
   manufacturing a first substrate which comprises a first insulating layer, a chip embedded in the insulating layer, and a wiring layer on a terminal face of the chip of the first substrate, wherein the wiring layer is provided thereon with an opening revealing the terminal face of the chip;
   manufacturing a second substrate which comprises a second insulating layer;
   applying a first adhesive layer onto the wiring layer such that the opening revealing the terminal face of the chip is not covered; and applying a second adhesive layer onto the second substrate; and
   attaching and curing the first adhesive layer of the first substrate and the second adhesive layer of the second substrate to obtain an embedded package structure having an air resonant cavity on the terminal face of the chip.

2. The method according to claim 1, wherein the manufacturing of the first substrate further comprises:
   preparing a frame made of a polymer medium, wherein the frame has a first Cu column passing through the frame and a chip socket surrounded by the frame;
   attaching an adhesive tape onto a bottom face of the frame and placing the chip into the chip socket, wherein the terminal face of the chip is attached onto the adhesive tape;
   filling the chip socket with a first insulating material to form the first insulating layer with the chip embedded therein;
   removing the adhesive tape; and
   forming the wiring layer on the bottom face the frame, wherein the wiring layer is formed thereon with the opening revealing the terminal face of the chip.

3. The method according to claim 2, wherein the forming of the wiring layer further comprises:
   applying a first seed layer to the bottom face of the frame;
   applying a first photoresist layer onto the first seed layer and forming a pattern thereon;
   performing Cu electroplating in the pattern to form the wiring layer;
   removing the first photoresist layer; and
   removing the first seed layer to form the opening revealing the terminal face of the chip.

4. The method according to claim 3, wherein the forming of the wiring layer further comprises:
   thinning the first insulating layer to reveal an end of the first Cu column.

5. The method according to claim 1, wherein manufacturing of the first substrate further comprises:
   preparing a sacrificial carrier;
   arranging a second photoresist layer on the sacrificial carrier;
   patterning the second photoresist layer to form a pattern;
   performing Cu electroplating in the pattern to form a first Cu column;
   peeling the second photoresist layer;
   laminating a dielectric polymer to the first Cu column;
   thinning and flattening the dielectric polymer to reveal an end of the first Cu column;
   removing the sacrificial carrier; and
   mechanically machining the dielectric polymer.

6. The method according to claim 1, wherein the manufacturing of the second substrate further comprises:
   applying a second insulating material onto a sacrificial carrier to form the second insulating layer;
   forming a second feature layer on the second insulating layer; and
   removing the sacrificial carrier to obtain the second substrate.

7. The method according to claim 6, wherein the sacrificial carrier is a Cu clad laminate having Cu foil double layers on at least one side thereof.

8. The method according to claim 7, wherein the manufacturing of the second substrate further comprises:
   applying the second insulating material onto a Cu foil face of the Cu clad laminate having the Cu foil double layers on the at least one side thereof, to form the second insulating layer;

forming a first feature layer on the second insulating layer; and removing the Cu clad laminate by separation of the Cu foil double layers such that a single layer of Cu foil remains on a bottom face of the second insulating layer.

9. The method according to claim 1, wherein the applying of the first adhesive layer further comprises:

applying the first adhesive layer by at least one of selective printing, screen coating and local gluing.

10. The method according to claim 1, wherein the first adhesive layer and the second adhesive layer comprise a thermosetting resin material.

11. The method according to claim 10, wherein the first adhesive layer and the second adhesive layer comprise the same material or different materials.

12. The method according to claim 1, further comprising:

forming outer feature layers on outsides of the first insulating layer and the second insulating layer.

13. The method according to claim 12, wherein the forming of the outer feature layers further comprises:

applying a second seed layer onto the first insulating layer;

applying a second photoresist layer onto the second seed layer and forming a pattern thereon;

performing Cu electroplating in the pattern to form a first outer feature layer; and removing the second photoresist layer and etching off the second seed layer.

14. The method according to claim 12, wherein the forming of the outer feature layers further comprises:

forming a blind hole on a bottom face of the second insulating layer to reveal the wiring layer;

applying a second seed layer onto the bottom face of the second insulating layer and into the blind hole;

applying a third photoresist layer onto the second seed layer and forming a pattern thereon;

performing Cu electroplating in the pattern and the blind hole to form a second outer feature layer and a second Cu column; and removing the third photoresist layer and etching off the second seed layer.

* * * * *